United States Patent [19]

Andreozzi

[11] Patent Number: 4,607,755
[45] Date of Patent: Aug. 26, 1986

[54] CHILDREN'S DRINKING VESSEL

[76] Inventor: William F. Andreozzi, P.O. Box 479, Greenville, R.I. 02828

[21] Appl. No.: 672,088

[22] Filed: Nov. 15, 1984

[51] Int. Cl.$^4$ .................. A47G 19/22; B65D 23/00
[52] U.S. Cl. ................... 215/1 A; 215/101; 215/229; 220/90.2; 220/90.4; 229/75; 224/42.45 R; 224/42.46 R; 224/148
[58] Field of Search ............ 215/1 A, 101; 220/90.2, 220/90.4, 85 H; 229/75; 224/148, 42.46 R, 42.45 R

[56] References Cited

U.S. PATENT DOCUMENTS

| 624,974 | 5/1899 | Provis | 215/101 |
|---|---|---|---|
| 2,756,740 | 7/1956 | Deane | 220/90.2 X |
| 2,948,453 | 8/1960 | Drown | 220/90.4 X |
| 3,163,338 | 12/1964 | Gottsegen | 224/42.46 R X |
| 3,406,868 | 10/1968 | Rogers | 220/90.2 |
| 3,438,527 | 4/1969 | Gamblin, Jr. | 215/1 A |
| 3,438,578 | 4/1969 | Peterson et al. | 215/1 A X |
| 3,558,033 | 1/1971 | Leeds | 215/1 A X |
| 3,635,380 | 1/1972 | Fitzgerald | 220/90.4 X |
| 3,773,256 | 11/1973 | Wright | 215/1 A X |
| 3,840,153 | 10/1974 | Devlin | 215/1 A X |
| 4,095,812 | 6/1978 | Rowe | 224/148 X |
| 4,244,477 | 1/1981 | Seel | 220/90.2 X |
| 4,291,814 | 9/1981 | Conn | 215/1 A X |
| 4,356,927 | 11/1982 | Cooper et al. | 215/1 A X |
| 4,428,498 | 1/1984 | Obey | 220/90.4 X |
| 4,441,640 | 4/1984 | Lottick | 215/1 A X |

FOREIGN PATENT DOCUMENTS

| 2542567 | 4/1977 | Fed. Rep. of Germany | 220/85 H |
| 407945 | 1/1910 | France | 215/1 A |
| 2312220 | 12/1976 | France | 215/1 A |

Primary Examiner—William Price
Assistant Examiner—Sue A. Weaver
Attorney, Agent, or Firm—Salter & Michaelson

[57] ABSTRACT

A children's drinking vessel for mounting on a fixed member in a vehicle and including a container to which a flexible drinking straw is disconnectably mounted thereon, the drinking straw being stored in a non-use position in encircling relation around the container and being movable to an extended position relative to the container, wherein the outer end of the straw is free for being received in the mouth of a child user, the container being prevented from tipping as mounted on the fixed member in the vehicle, while the child user drinks the fluid in the container through the extended drinking straw.

5 Claims, 3 Drawing Figures

U.S. Patent  Aug. 26, 1986  4,607,755
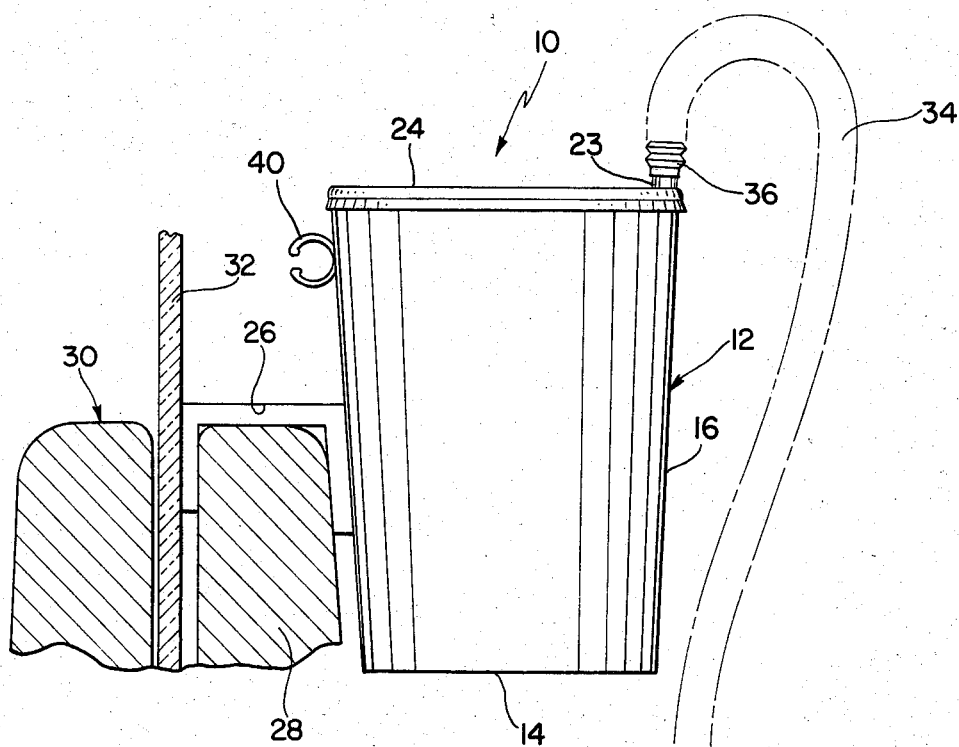
FIG. 1
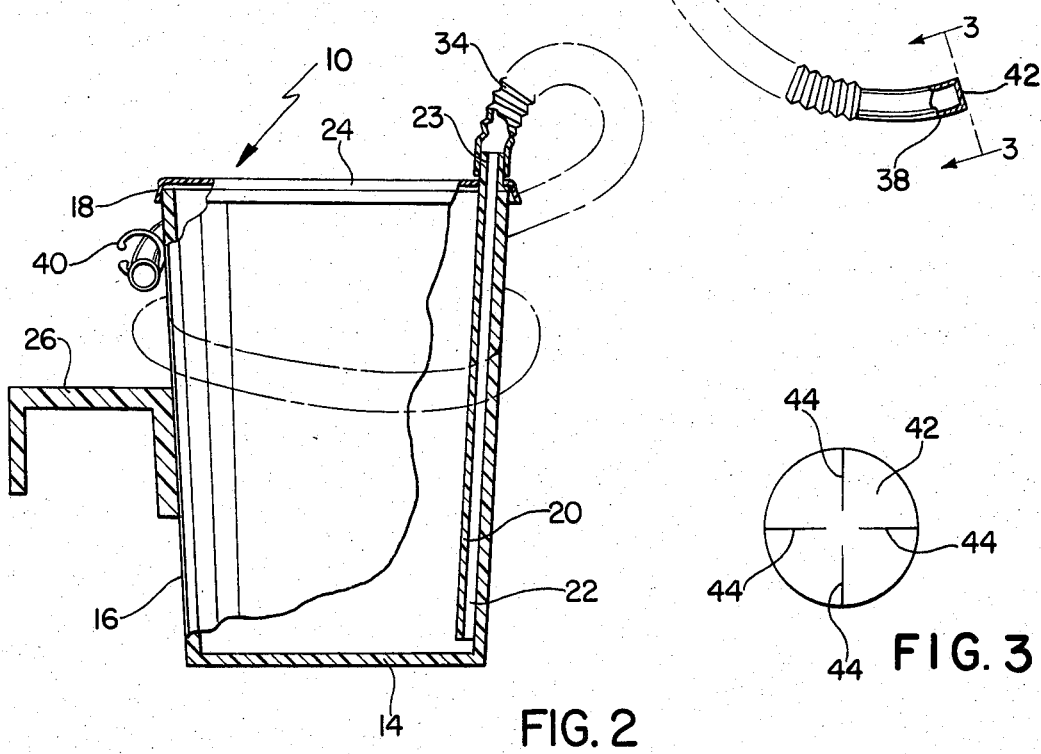
FIG. 2
FIG. 3

CHILDREN'S DRINKING VESSEL

BACKGROUND OF THE INVENTION

The present invention relates to a children's drinking vessel that is primarily for use in a vehicle, so that a child user may drink liquid contents from the vessel through a flexible straw without the vessel being tipped and spilling liquid contained in the vessel during movement of the vehicle.

The drinking of liquids from a cup or container by children in a moving vehicle has always been somewhat of a hazard, since children have a tendency to spill the contents of the container while the vehicle is in motion, and on occasion when the vehicle encounters bumps or ruts in the road over which the vehicle is traveling, the tendency for spilling the contents of the liquid as held by the child riding in the vehicle increases. Some attempts have been made to solve the problem by providing the container with a cap or a lid through which a straw is inserted. Having a cap or lid on a container does tend to reduce the tendency to spill the liquid therefrom, although tipping of the container or actually dropping it on the floor of the vehicle still occurs due to the very nature of the manner in which young chidren handle cups and containers in moving vehicles.

Some efforts have also been made to provide special kinds of containers having permanent straws inserted therein, although such articles have never actually solved the problem that is inherent in the handling of a container by a child in a moving vehicle. Other kinds of special containers have also been used for aiding in drinking therefrom, but have not found favor in the trade. The most pertinent prior art known to applicant and that pertain to the invention embodied herein, are ALLEN U.S. Pat. No. 2,432,132; SCHWARTZ, No. 3,172,561; ROGERS, No. 3,406,868; SWEET et al No. 3,445,033; LEEDS, No. 3,558,033; HOMORODEAN, Jr., et al No. 3,606,156; WALSH No. 4,252,256; and HOLLOWAY No. 4,428,490. As will be evident from a study of these patents, none of the disclosures as illustrated therein either show or suggest the concept of avoiding the spilling of liquid from a container in a moving vehicle as solved by applicant in the subject invention, as will be hereinafter described.

SUMMARY OF THE INVENTION

The present invention is directed to a children's drinking vessel for mounting on a fixed member in a vehicle and includes a container on which a flexible drinking straw is disconnectably secured and that has an inner end that communicates with liquid located within the container. The straw is constructed and arranged such that the outer end thereof is free and is extendable substantially beyond the container for being received in the mouth of a child user. A bracket is fixed to the outersurface of the container and is mountable on the fixed member in the vehicle to secure the container therein in a substantially rigid upright position. The container as mounted is thus prevented from tipping in the vehicle, while the child user drinks the liquid in the container through the straw as extended. The straw is also movable from the extended position of use to a position of non-use, wherein it encircles the container.

Accordingly, it is an object of the present invention to provide a children's drinking vessel for mounting on a fixed member in a moving vehicle and that includes a flexible straw that is located in encircling relation around the container in the position of non-use, and that is movable to an extended position for use by a child in drinking the liquid from the container.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is an elevational view of the drinking vessel as embodied in the present invention and is shown mounted on a fixed member in a vehicle, a flexible straw as used therewith being shown in the extended position of use thereof;

FIG. 2 is a sectional view of the drinking vessel with parts shown in elevation and illustrating the flexible straw in the encircling non-use position relative to the vessel; and FIG. 3 is a view taken along line 3—3 in FIG. 1.

DESCRIPTION OF THE INVENTION

Referring now to the drawing, and particularly, to FIG. 1, the drinking vessel embodied in the present invention is illustrated and is generally indicated at 10. The drinking vessel 10 includes a container generally indicated at 12 which, as shown more clearly in FIG. 2, includes a bottom wall 14, a cylindrical body portion 16 that has an upwardly tapered configuration that terminates at the upper end thereof in a lip 18. Joined integrally to the inner wall of the body portion 16 of the container 12 is a tube 20 in which a passageway 22 is formed, the tube 20 and passageway 22 as formed therein extending in a generally vertical direction and being located in parallel relation with respect to the adjacent wall of the body portion 16. The lowermost end of the tube 20 is spaced upwardly with respect to the bottom wall 14 of the container 12 which provides for communication of the passageway 22 with the interior of the container. The uppermost end of the tube 20 extends somewhat above the lip 18, the passageway 22 thus extending above the lip 18 and being exposed to provide for drinking the liquid from the container or for receiving a drinking straw thereon as will be described. As shown in FIGS. 1 and 2, a lid 24 is mountable on the uppermost end of the container in snap fitting relation over the lip 18 and is formed with an appropriate opening through which the upper end of the tube 20 extends. As will be described, the lid 24 aids in preventing the spilling of the contents of the container 12 when the vessel is in a position of use and particularly during movement of the vehicle in which the vessel is mounted.

Since the drinking vessel 10 has particular application for use in a moving vehicle, it is desirable to provide for the mounting thereof in a fixed position in the vehicle. For this purpose, a bracket handle 26 is provided, and has a shape and configuration that enables the bracket to fit over the inside portion 28 of a door generally indicated at 30 and into which a window 32 extends. Thus, the bracket handle 26 is located interiorly of the window 32 and is received in snug fitting relation around the upper end of the portion 28 of the door 30, and in engaging relation with the interior surface of the window 32. The vessel 10 is thus mounted in firm relation on the door of the vehicle in the position of use. It is also apparent that the bracket handle 26 may be used as a handle to grip the container when it is used apart from the mounted position thereof.

The purpose of the vessel 10 of the subject invention is to enable a child user to have access to the liquid contained therein without having to actually tilt the vessel for removing the liquid therefrom. For this purpose, a flexible straw 34 is provided and is formed with a continuous series of bellows-like pleats throughout substantially the length thereof that enables the straw to be easily bent to a variety of positions. As shown in FIG. 1, the straw 34 includes an inner end 36 that is mounted on the upper end 23 of the tube 20 and also includes an outer free end 38 that in the position of use is extended substantially beyond the confines of the container 12. In the position of non-use, the flexibility of the straw 34 enables it to be moved into encircling relation around the exterior surface of the container 12, the free end 38 being received in a clip 40 that is secured to the exterior surface of the body portion 16 of the container 12 in vertically spaced relation with respect to the bracket 26.

In order to prevent dripping of liquid from the drinking and 38 of the straw after use thereof, the outermost or free end 38 of the straw is provided with a valve indicated at 42 in FIG. 3. The valve 42 is formed with a plurality of slits 44 therein that cause the valve 42 to open in response to suction pressure by the user of the vessel to provide for free passage of the liquid therethrough. Thus when a child user applies suction pressure to the free end of the drinking straw 34, the valve 42 opens to permit the passage of fluid therethrough. Upon release of the suction pressure, the valve 42 closes to prevent dripping of liquid through the free end 38 of the straw 34.

In use of the device, the vessel 10 is mounted in a fixed position in the interior of the vehicle by placing the bracket handle 26 on the inside portion 28 of the door 30 and in contact with the window 32. With the liquid having aleady been introduced into the interior of the container 12, the flexible straw 34 is removed from the non-use position illustrated in FIG. 2 by withdrawing the free end 38 from the clip 40 and extending the straw to the desired location. The lid 24 is also located in place on the lip 18 of the container 12 and the child user can then move the straw 34 to a desired position for withdrawing the liquid from the container through the straw. Suction pressure exerted on the free end 38 of the straw 34 will cause the liquid to be removed from the container through the passageway 22 and the straw 34. As suction pressure is applied to the free end of the straw 34, the valve 42 is opened to allow the liquid to pass therethrough. When the liquid is depleted from the container or if the straw 34 is to move to the non-use position, it is wrapped in encircling relation around the outside surface of the body portion 16 of the container 12 as illustrated in FIG. 2 and the free end 38 replaced in the clip 40.

It is seen that the drinking vessel of the subject invention provides a unique and safe manner of dispensing liquid from a container in a moving vehicle, and has paricular application as a children's drinking vessel since the construction of the vessel, including the container 12 and drinking straw 34, ensures that the container 12 will not be tipped in use and that the liquid can be safely withdrawn from the container without spilling.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A children's drinking vessel for mounting on a fixed member in a moving vehicle, comprising a container in which a liquid to be consumed by a child user of the vessel is received, said container including a bottom wall, a cylindrical body portion joined to said bottom wall and an upper rim joined to the uppermost end of said body portion, a flexible straw disconnectably mounted on said container and having an inner end that communicates with the liquid located within said container, said straw being constructed and arranged such that the outer end thereof is free and is extendable substantially beyond said container for being received in the mouth of a child user in a position of use, said straw being movable from the extendable position in the position of use to an encircling position around the outer surface of the side wall of said container to a position of non-use, clip means fixed to the outer surface of the side wall of said container normally on the side thereof opposite to the location of the straw when it is in the position of use, said clip means receiving an end portion of the outer end of said straw in a fixed position for locating said straw in the non-use position thereof on said container, and a bracket secured to the side wall of said container for locating said container in an upright fixed position on said fixed member in said vehicle, wherein said container is prevented from tipping in said moving vehicle while said child user drinks the liquid in said container through the straw as extended in the position of use, said bracket being located on said container side wall and spaced from the upper rim of the container to enable the straw to encircle said container and be held in the non-use position by location of the end portion of the straw in said clip means.

2. A children's drinking vessel as claimed in claim 1, said straw having a pleated-type wall construction substantially the length thereof that provides for movement of said straw to a variety of positions and that enables the outer end of said straw to be extendable substantially beyond the confines of said container.

3. A children's drinking vessel as claimed in claim 1, a lid mounted on the upper rim of said container and enclosing the liquid therein.

4. A children's drinking vessel as claimed in claim 1, the outermost end of said straw having a valve built therein that is movable under suction pressure exerted by the drinking action of the user to provide for discharge of liquid therethrough, and that upon release of the suction pressure returns to a position to prevent leakage of liquid therethrough.

5. A children's drinking vessel as claimed in claim 1, said container having a passageway integrally formed therein adjacent to the inner surface of the side wall thereof and extending from an inner location that is spaced from the bottom wall of the container to an outer location that is disposed above the upper rim of the container for receiving said straw thereon, wherein the suction pressure exerted on said straw by the child user draws the liquid through the passageway into said straw.

* * * * *